Figure 1A:
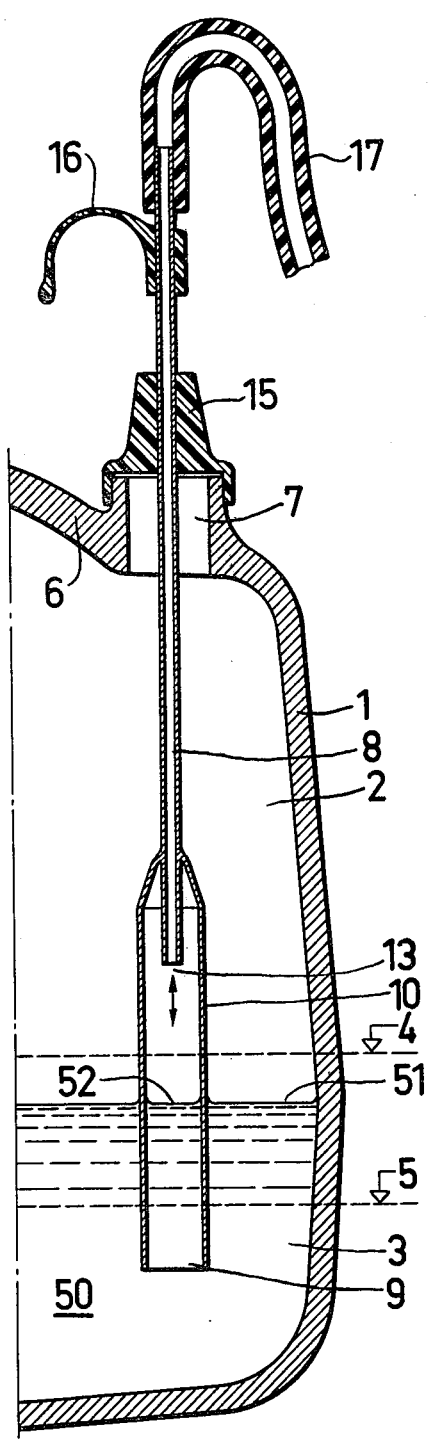

United States Patent [19]

Anderson

[11] 4,072,053
[45] Feb. 7, 1978

[54] APPARATUS FOR INDICATING LIQUID LEVEL IN A RECEPTACLE

[76] Inventor: Stig Lennart Anderson, 4 Naverlursgatan, Vastra Frolunda, Sweden, S-421 44

[21] Appl. No.: 738,895

[22] Filed: Nov. 4, 1976

[30] Foreign Application Priority Data

Nov. 5, 1975 Sweden .............................. 7512363

[51] Int. Cl.² .......................... G01F 23/16; G01L 7/08
[52] U.S. Cl. ........................................ 73/303; 73/747
[58] Field of Search ......................... 73/302, 303, 401; 417/437

[56] References Cited
U.S. PATENT DOCUMENTS

| 732,578 | 6/1903 | Murphy | 73/303 |
|---|---|---|---|
| 1,268,292 | 6/1918 | Stancliffe | 73/302 |
| 1,758,077 | 5/1930 | Fentress | 73/302 |
| 1,801,643 | 4/1931 | Seferlis | 73/302 |
| 2,701,672 | 2/1955 | Glasco | 417/437 |
| 2,785,852 | 3/1957 | Bramming | 417/437 |
| 3,972,234 | 8/1976 | Osojnak | 73/303 |

Primary Examiner—Daniel M. Yasich
Attorney, Agent, or Firm—Fitch, Even, Tabin & Luedeka

[57] ABSTRACT

An indicating apparatus for enabling a motor car driver to read the crankcase oil level by depressing a diaphragm forming part of an indicating unit. The diaphragm then opens and closes connections between a measuring tube reaching down into the crankcase oil and the indicating unit in such a manner as to reproduce the crankcase oil level in an indicating tube forming part of the indicating unit, regardless of pressure and temperature variations of the crankcase oil and ambient air.

8 Claims, 6 Drawing Figures

FIG. 2a
FIG. 2b
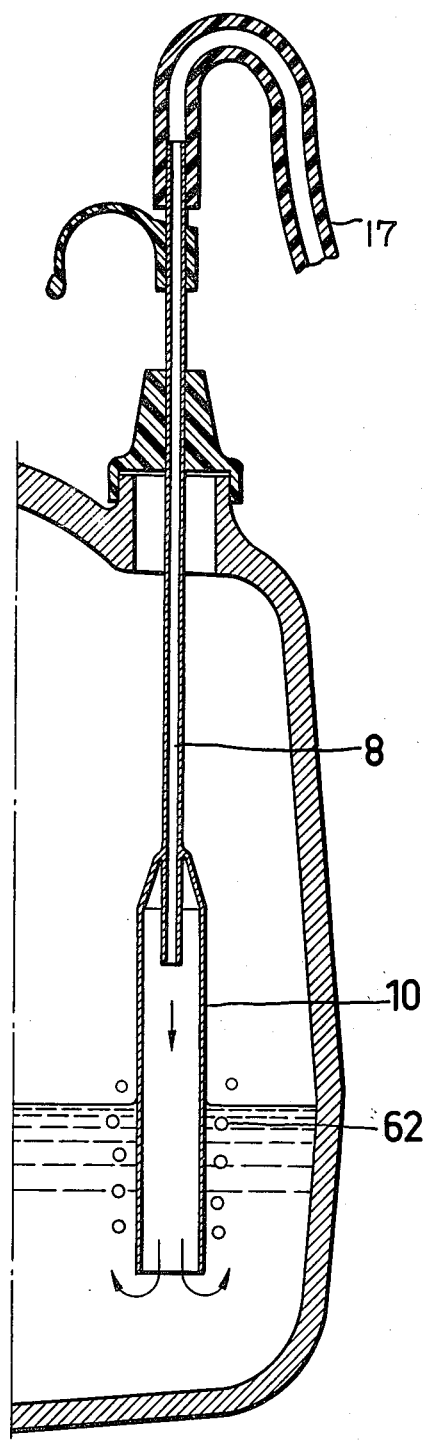
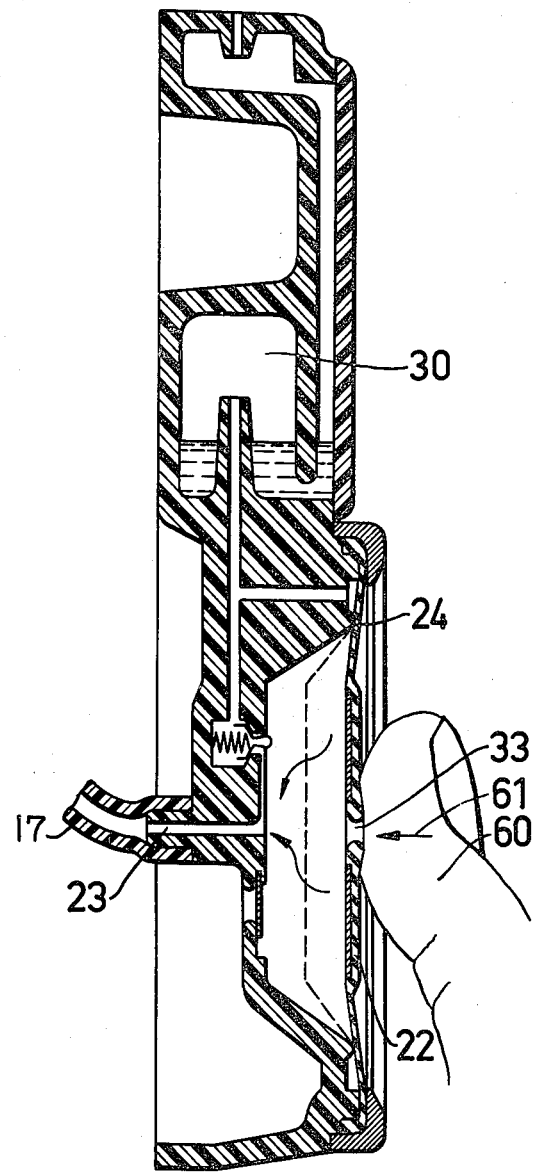

U.S. Patent  Feb. 7, 1978  Sheet 3 of 3  4,072,053

APPARATUS FOR INDICATING LIQUID LEVEL IN A RECEPTACLE

The present invention relates to an apparatus for indicating the liquid level in a receptacle, more particularly the oil level in the crankcase of an internal combustion engine, said apparatus comprising a measure tube extending downwards into the crankcase below the lowermost design oil level and an indicating member connected to the measure tube by means of a slender flexible tube, said member being operable manually to open and close by means of pump and valve members connections between the ambient air, an air chamber in the indicating member, a liquid chamber in the indicating member and the measure tube in such sequence that the liquid quantity trapped in the liquid chamber is raised in an indicating tube with a transparent wall to a height corresponding to the oil level in the crankcase.

The invention has for its chief object to provide a simple and easily controlled improved apparatus for the said purpose having a minimum number of moving parts and being capable of giving correct indications of the oil level in the crankcase. This object is attained according to the invention thereby that the air chamber of the indicating member which communicates through the flexible tube with the measure tube, is provided with a pump member in the shape of a wall which is formed at least partly of a resilient diaphragm isolating the air chamber from the ambient air on being pushed inwards, that further the air chamber communicates with the liquid chamber of the indicating member through a narrow passage which is closed as the diaphragm wall is beginning to be pushed inwards, and that a normally closed valve member is operable on pushing the diaphragm fully home to open communication between the measure tube and the liquid chamber to enable indicating liquid to rise in the indicating tube to a height corresponding to the oil level in the crankcase by the air pressure transmitted to the liquid chamber.

The apparatus according to the invention can be constructed very compact and robust by virtue of its uncomplicated design having a minimum of moving parts. This is of the greatest value when handling, dispatching and mounting the device. According to a further feature the apparatus can be made leak-proof with simple means, i.e. with the indicating liquid contained therein always safely trapped in any position of the apparatus.

An embodiment of the apparatus according to the invention will be described hereinafter, reference being had to the drawings.

Figure 3A:
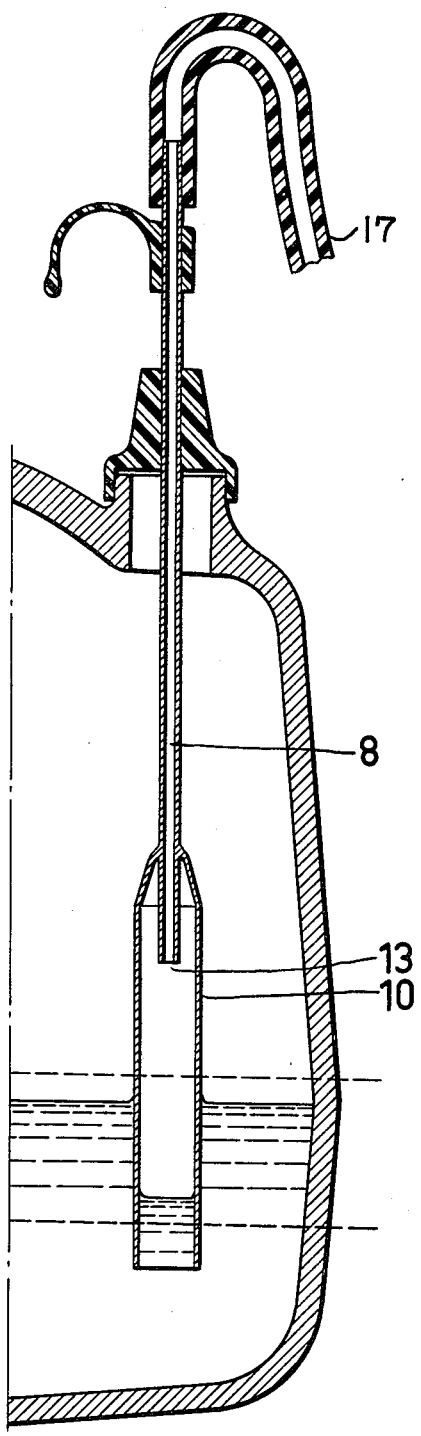

FIGS. 1a, 2a, and 3a illustrate in vertical section views the measure tube of the apparatus in its operative position in the crankcase of an engine, different steps of the operation of the device being illustrated.

Figure 1B:
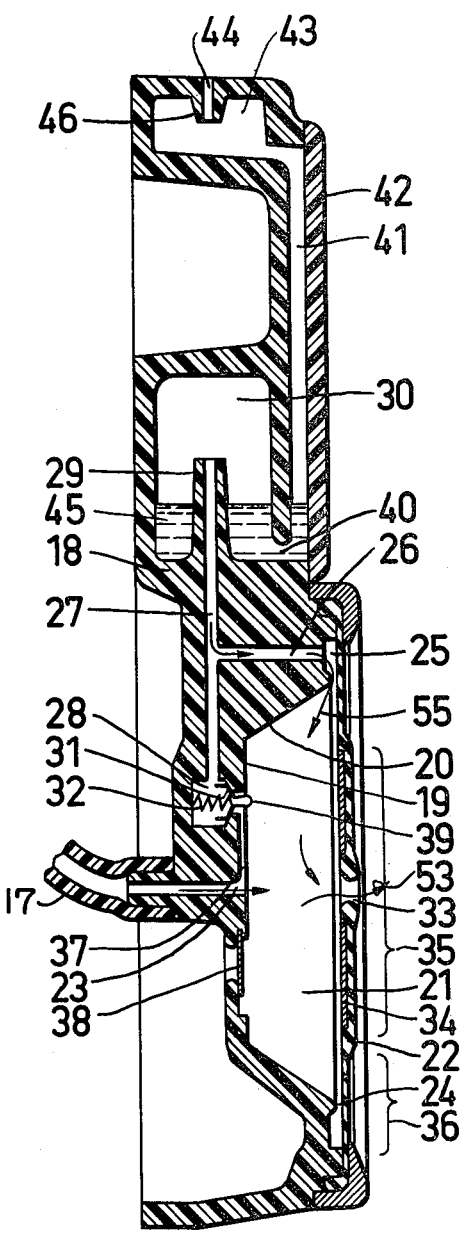
Figure 3B:
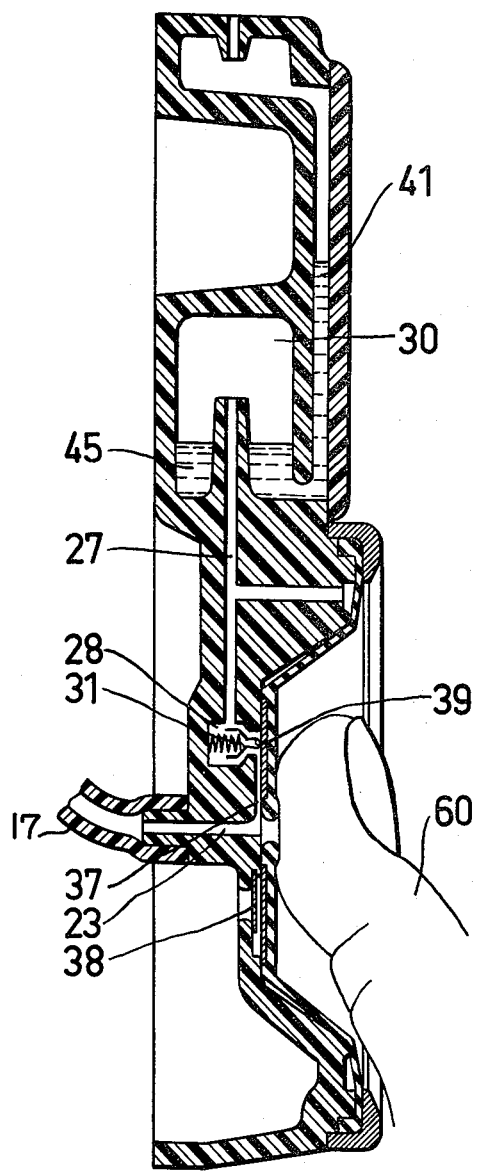

FIGS. 1b, 2b, and 3b illustrate, also in vertical section views, the indicating member of the apparatus during the corresponding operation steps.

FIG. 1a is a fragmentary section of the crankcase of an automobile engine. The crankcase wall 1 encloses an oil sump 2, wherein the level of the oil 3 is permitted to vary between a highest level 4 and a lowest level 5. In the upper part 6 of the crankcase wall there is a passage hole 7, and a slender measure tube 8 is inserted therein to such a depth that its open bottom end 9 reaches below the lowermost permissible oil level 5. The measure tube 8 has its bottom portion 10 enlarged to such a diameter, for example 5 mm, that will still pass through the hole 7. The enlarged tube portion 10 is of such a length that the permissible upper oil level 4 does not reach the tube restriction 13 forming a transition between the enlarged tube portion 10 and the slender tube 8. The latter preferably extends somewhat into the enlarged tube portion 10. The measure tube 8 is held stationary in its position relative to the oil levels 4 and 5 by means of an adjustable abutment collar 15. By means of this collar the measure tube can be adapted to different engines of different sizes and manufacture. The measure tube 8 is provided with a lifting member 16 for mounting it in the crankcase and removing it therefrom, respectively.

The measure tube 8 is connected by means of a slender flexible tube 17 to an indicating member, FIG. 1b, that is mounted facing the driver's seat. The tube 17 should be of the least possible dimension (1 to 2 mm internal diameter). The housing 18 of the indicating member is shaped at the base with a bottom 19 and walls 20 defining a chamber 21 the front wall of which is formed by a diaphragm 22. The chamber 21 communicates through a passage 23 with the flexible tube 17 the opposite end of which is connected to the measure tube 8 in the engine crankcase. The wall 20 of the chamber which is preferably of frusto-conical shape defines together with the diaphragm 22 in its non-actuated state a very narrow (of the order of a tenth of a millimeter) annular passage 24 forming a connection between the chamber 21 and a circumferential annular groove 25. The annular groove 25 communicates through a passage 26 with a conduit 27 opening at its lower end into a valve chamber 28 and at its upper end through a neck-shaped projection 29 into a liquid chamber 30. The valve chamber 28 accommodates a valve member 31 shutting off the valve chamber from the air chamber 21 by the action of a spring 32. The diaphragm 22 is passed through centrally by a hole 33 connecting the air chamber 21 with the ambient air. The central portion 35 of diaphragm 22 is reinforced by a rigid washer or plate 34 to prevent deformation of that portion, whereas the peripheral diaphragm portion 36 of thin rubber is resiliently deformable and permits pushing the diaphragm towards the chamber bottom 19.

Between the passage 23 and the valve chamber 28 there is provided an open shallow channel 37 which forms an air passage between the valve chamber 28 and the passage 23 even when the diaphragm is pushed fully home against the chamber bottom 19.

A check valve 38 at the chamber bottom 19 prevents air from flowing away from chamber 21 when it is pressurized whereas it will open immediately to admit air at vacuum in the chamber. The valve member 31 is shaped with a projection 39 extending some tenths of a millimeter beyond the chamber bottom 19. Thereby the valve member 31 will open when the diaphragm 22 is pushed so as to abut the chamber bottom 19.

The liquid chamber 30 of the indication housing communicates through a hole 40 at its base with the indicating tube 41 the outer wall of which is a sight glass 42. The indicating tube 41 opens at the top into a safety chamber 43 communicating with the ambient air through a hole 44.

The indicator liquid 45 held in the chamber 30 is of such volume that liquid can rise on pressure increase in chamber 30 the whole length of the tube 41 without the air held in chamber 30 reaching the communication hole 40.

The both passages 27 and 44 open into their respective chambers 30 and 43 within necks 29 and 46, respectively, extending into the chambers. The height of these necks is such that the passages terminate at the centre of the respective chambers, to prevent liquid leakage during shipment and handling when the position of the indicator housing will be indeterminate.

The functioning of the apparatus will now be described.

FIGS. 1a and 1b illustrate how the indicator apparatus mounted at an automobile engine functions during operation of the vehicle. The oil 50 held in the crankcase, FIG. 1a, has a normal operation level 51 which oscillates somewhat upwards and downwards. The movements of the vehicle and engine cause the oil upper surface to become rather agitated. The oil level 52 of the oil within the measure tube 10 will pulsate accordingly and will press and aspire air held in the measure tube 8. There will never be any build-up of pressure, however, since the measure tube and the flexible tube communicate directly with the ambient air through passage 23, chamber 21 and the central diaphragm hole 33. This is shown in FIG. 1b with arrow 53. A pressure increase caused by temperature rise is prevented by the same means. The arrows 55 in FIG. 1b show how the pressure chamber 30 of the indicating member communicates with the ambient air in a similar manner through passages 27 and 26, and the annular passage 24, chamber 21 and the hole 33. When the engine is running the whole indicating system is uncharged and does not give any indication in the shape of a liquid column in the tube 41.

When the oil level shall be checked, for example when filling petrol, the engine is stopped. The driver applies a finger 60 against the indicator diaphragm 22 as shown in FIG. 2b. The finger by pushing the diaphragm will close the diaphragm hole 33 in the first place. This will suspend communication with the ambient air of the tube assembly 17, 8, and 10, on one side, and of the passage system with the indicator liquid chamber 30, on the other. When the diaphragm is pushed inwards according to arrow 61 the annular passage 24 is closed immediately. This results in isolating the liquid indicator completely from the air chamber 21 as well as from the tube assembly connected to the oil sump. The diaphragm is pushed further by the finger to engage the bottom 19 of the air chamber 21. Thereby the air held by the chamber 21 must escape. This air will flow through passage 23 to the flexible tube 17 and further downwards through measure tube 8. Oil which may stand within tubes 8 and 10 will be evacuated in that operation. The oil surface 52 is forced downwards to the bottom edge 9 of tube 10, and the air will rise as bubbles 62 through the crankcase oil. By reason of the narrowness of the tubes the air volume 21 will be sufficient, in spite of its relatively small magnitude, for an efficient scavenging of the whole tube assembly. In order not to be subjected to pressure shocks causing faulty readings the liquid indicator 30 with its internal system of passages is completely shut off during the whole scavenging sequence by the closing of the annular passage 24.

Since the diaphragm 22 has a resilient portion adjacent its periphery only the outer diaphragm portion is deformed while the flat central portion is pushed against the chamber bottom 19. Any influence of different finger sizes or the like is eliminated thereby. The valve member 31 (FIG. 3b) is pushed against its projection 39 by the diaphragm immediately before the latter reaches the chamber bottom 19. The valve member 31 then will open, and communication is established between the liquid indicator chamber 30, the passage 27, the valve passage, channel 37 and the assembly 23, 17, 8 and 10 (FIGS. 3b and 3a). Oil outside tube 10 then will be forced up through the tube. Air within this assembly will be compressed somewhat and will thus transfer the oil pressure within the crankcase to liquid chamber 30. The indicator liquid 45 sinks and simultaneously the liquid in the indicator tube 41 will rise. The resulting liquid column is directly proportional to the oil level in the crankcase. A suitable graduation at the indicator permits a direct and swift reading of the oil level in the crankcase, without taking any special steps.

When reading has been effected the finger pressure on the diaphragm is released and the latter resumes at once its flat initial shape. Thereby the valve member 31 will close in the first place. The indicator is now again completely shut off, but the liquid level can still be read. Ambient air enters on return of the diaphragm through the diaphragm hole 33 to prevent a vacuum to form in tube system 10, 8, 17 and 23. It is not desirable that oil is aspired into the system, and by that reason the check valve 38 is provided in the chamber bottom 19. This valve prevents pressure to escape from chamber 21 the wrong way during pressure build-up but permits, if necessary, air to enter during the return to initial position of the diaphragm 22. Shortly before this position is reached the passage 24 is opened. Thereby the liquid indicator is zeroized, and the complete apparatus resumes the neutral state illustrated in FIGS. 1a 1b. Now as before the measuring member is insensible to temperature and pressure variations.

What I claim is:

1. Apparatus for indicating the liquid level in a receptacle, more particularly the oil level in the crankcase of an internal combustion engine, said apparatus comprising:

a measure tube extending downwards into the crankcase below the lowermost design oil level;

an indicating member connected to said measure tube by means of a slender flexible tube;

means defining an air chamber in the indicating member, said air chamber being in air communication with said measure tube through the slender flexible tube;

means defining a liquid chamber in the indicating member, said liquid chamber containing a quantity of liquid trapped therein below a column of air;

an indicating tube in said indicating member having fluid communication with the liquid in said liquid chamber, said indicating tube having a transparent vertical wall and adapted to receive liquid from the liquid chamber to a height corresponding to the oil level in the crank case;

means in said indicating member defining a narrow passage connecting said air chamber and the air above the liquid in said liquid chamber and including means connecting said air above the liquid and the ambient air for communication of air therebetween and between said measure tube and said liquid chamber;

a pump member in the form of a wall defining one side of said air chamber and including means oeprational for separating said air chamber from the ambient air, said pump member being formed at least partly of a resilient diaphragm around a central wall portion and being manually pushable inwardly of said air chamber to a home position against a bottom wall thereof, the resilient diaphragm portion of said pump member being effective to first close said narrow passage to thereby close off air communication between said air chamber and the ambient air and the air above the liquid in said liquid chamber upon initial movement inwardly of the resilient diaphragm when said pump member is pushed inwardly of the air chamber; and a normally closed valve member located in said indicating member in an alternate passage connected to said narrow passage between said air chamber and the air above the liquid in said liquid chamber, said valve member being operable on pushing said pump member inwardly and fully home to thereby open air communication between said measure tube and the air above the liquid in said liquid chamber after closeoff of said air chamber and ambient air therefrom to enable indicating liquid to rise in said indicating tube to a height corresponding to the oil level in the crank case by air pressure being transmitted therethrough to said liquid chamber from said measure tube.

2. Apparatus according to claim 1, wherein the measure tube has a lower enlarged portion which projects below the lowest design oil level and has a height such that it extends above the uppermost design oil level.

3. Apparatus according to claim 2, wherein the measure tube extends downwards somewhat into the enlarged portion.

4. Apparatus according to claim 1, wherein the diaphragm wall is circular and has a central hole which can be closed by a finger, and wherein the central wall portion is reinforced and rigid.

5. Apparatus according to claim 1, wherein the narrow passage includes an annular passage defined by the resilient portion of the diaphragm wall and the wall of the air chamber and is in communication with an annular chamber surrounding concentrically the air chamber and connected by passage means to the column of air above the liquid in said liquid chamber.

6. Apparatus according to claim 1, wherein the valve member is disposed in a aperture in the bottom wall of the air chamber and controls a passage between said aperture and said narrow passage connecting the column of air above the liquid in said liquid chamber and is operable to be opened by the rigid central portion of the diaphragm wall, and further comprising channel means in the bottom of the air chamber providing communication between the measure tube and the liquid chamber when the diaphragm wall is pushed fully inwards.

7. Apparatus according to claim 1, further comprising a check valve opening into the air chamber for pressure equalizing towards the ambient air and for opposing aspiration of oil into the measure tube.

8. Apparatus according to claim 1, wherein the connection between the liquid chamber and the air chamber opens into the column of air above the liquid in said liquid chamber through an extension projecting therein, and further comprising another air passage from the ambient air to the indicator tube through an extension projecting into an enlarged chamber above the indicator tube, said extensions being dimensioned to keep the indicating liquid always trapped in any position of the apparatus.

* * * * *